June 23, 1925.
A. R. LUNDSTEDT
COLLAPSIBLE SANITARY FISH CREEL
Filed Jan. 16, 1925
1,543,446
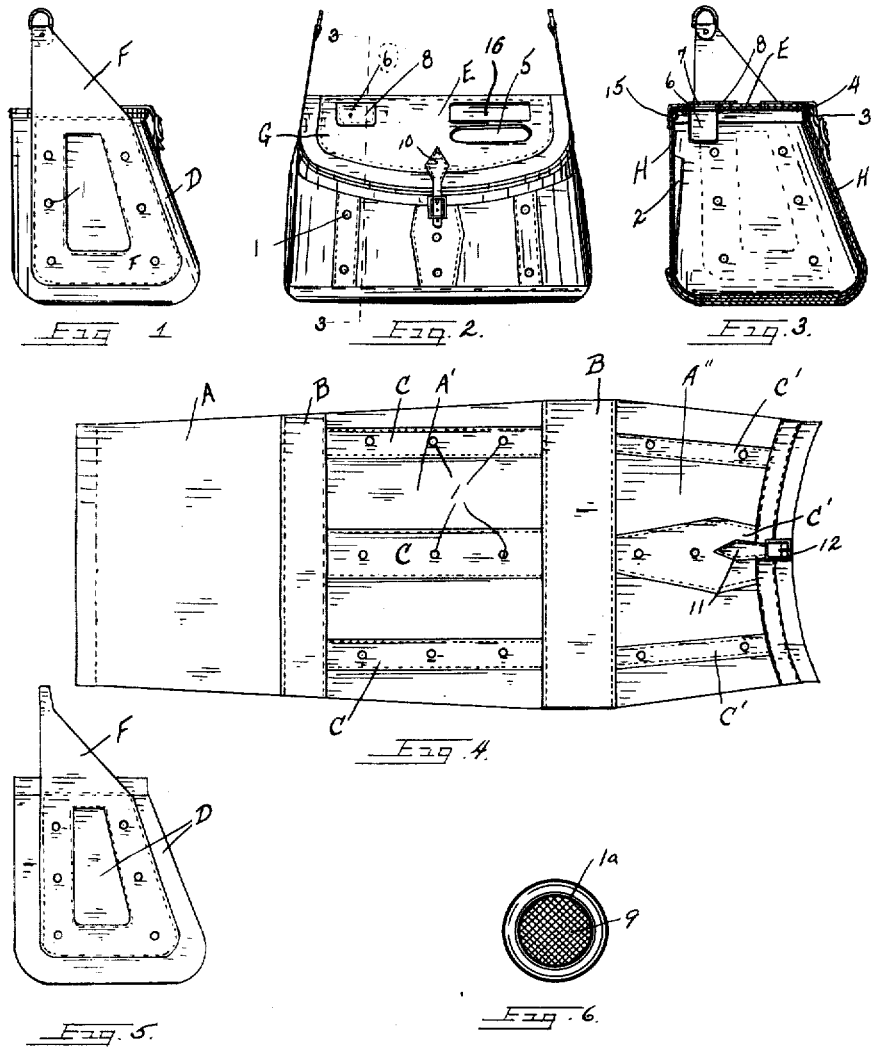
INVENTOR
Antone Reuben Lundstedt
BY J. M. Thomas
ATTORNEY Patented June 23, 1925.

1,543,446

UNITED STATES PATENT OFFICE.

ANTONE REUBEN LUNDSTEDT, OF SALT LAKE CITY, UTAH, ASSIGNOR OF ONE-HALF TO ELI J. MARSHALL, OF SALT LAKE CITY, UTAH.

COLLAPSIBLE SANITARY FISH CREEL.

Application filed January 16, 1925. Serial No. 2,732.

*To all whom it may concern:*

Be it known that I, ANTONE REUBEN LUNDSTEDT, a citizen of the United States, residing at Salt Lake City, in the county of Salt Lake and State of Utah, have invented certain new and useful Improvements in Collapsible Sanitary Fish Creels, of which the following is a specification.

My invention relates to fish creels and has for its object to provide a new, convenient and useful device in which fish may be kept by an angler while fishing.

A further object is to provide a sanitary means of carrying fish and a creel that can be washed after each trip, insuring a clean basket for the next trip, and further doing away with the disagreeable odors so common to the regular fish basket in which fish have been kept a number of times without having been washed.

I also provide a collapsible compact fish creel that, when used in a brushy country, can be collapsed under the arm and carried through the brush without catching and being as bunglesome as the regular reed basket commonly used.

I also provide a sanitary way of keeping fish from spoiling due to warm weather, for, after a mess of fish have been caught, the canvas outside of the creel may be soaked in water and the interior kept cool and free from flies or other insects.

These objects I accomplish with the device illustrated in the accompanying drawings, in which similar letters and numerals of reference indicate like parts throughout the several views and as pointed out in the appended claims.

In the drawings in which I have shown the best and most substantial embodiment of my invention, Figure 1 is an end elevation of the creel. Figure 2 is a front elevation of the same. Figure 3 is a section on line 3—3 of Figure 2. Figure 4 is a plan view of the partially sewed materials out of which the device is constructed and the forms given such material for the front, bottom and rear of the creel; and Figure 5 is a view of one end piece before it has been sewn into the creel, showing the position of the leather and the ventilating openings. Figure 6 is a detail of one of the eyelets used in the ventilation openings.

The body of canvas is cut in the form shown in Figure 4, as marked A, A' and A", on the outer face of which canvas is sewed transverse strips of leather B which form the lower edges or corner edges of the device. Also on the same surface or outer face of the said canvas A are sewed longitudinally disposed leather strips C and C'. Spaced apart openings 1 are provided through both the strips C' and the contiguous canvas for ventilating the interior of the device when assembled and in use. Two pieces of canvas D are cut, having the shape and form shown in Figures 1 and 5, which are to be sewed to the other portions of the device to form the ends of the creel, and a leather portion F is secured to the end D to strengthen it and provide a means of carrying the creel. A waterproof lining H is sewed into the inside of the creel when it is sewed together, and on the back portion a pocket 2 is secured for holding the fisherman's outfit of lures. Wires 3 and 4 are made in the shape wished for the top of the creel and the wire 3 is secured on the top of the body of the creel and the wire or shape 4 is secured around the edge of the lid of the creel, thus giving shape and rigidity to the lid and the top portion of the body. An elongated opening 5 is cut in the top of the creel, through which the fish when caught are passed into the creel and a flap 16 is secured to the top or lid E for covering the opening 5. A bait or lure pocket 6 is provided on the top and secured on the under side thereof, with a hole 7 in the lid or top of the device for access to the pocket; and a flap 8 is secured to the top or lid E for covering the said bait pocket 6. The said spaced-apart openings 1 are bound by metal eyelets 1ª and in which a fine mesh screen 9 is secured for excluding flies and insects. A strap 10 on the lid E and a strap 11 and the buckle 12 on the body of the creel are used for closing the lid E. When the end pieces D and the body 'A, A', A", are sewed together the lid E is secured thereto by the piece of leather G, which leather G is sewed to the top as a reinforcement and along the back A to form a hinge, as at 15. An interior waterproof lining H, preferably made of rubberized fabric and conforming with the interior of said creel, is sewed to the canvas A, A', A" and end pieces D, and with its upper edges sewed and fastened around the said wire form 3 to form the interior surface of the device. The stitching of the leather strips C, C', B and F to their respective canvases, and the eyelets 1ª hold the said lining H contiguous the fabric, and allows the device to be turned inside out for cleaning.

Having thus described my invention I desire to secure by Letters Patent and claim:—

1. A fish creel comprising a fabric sack having a reinforced upper edge; longitudinally and laterally disposed leather strips sewed on one face of said fabric having ventilating holes therein and through the fabric to the interior of said sack; a reinforced cover hinged to said sack and having elongated openings therein; a bait pocket within said sack and with its mouth surrounding one of said openings; a hinged cover for each of said openings; and a sanitary lining for said fabric sack and having an open pocket sewed therein.

2. A collapsible fish creel comprising a fabric sack having a reinforced upper edge; leather straps sewed on the outer face of said sack and having ventilating holes therein in alinement with like holes through said fabric; a reinforced cover hinged to the upper edge of said sack and having elongated openings therein; and a sanitary lining sewed to the interior of said sack, with an open pocket sewed on the back of said lining.

In testimony whereof I have affixed my signature.

ANTONE REUBEN LUNDSTEDT.

of the device. The stitching of the leather strips C, C', B and F to their respective canvases, and the eyelets 1ª hold the said lining H contiguous the fabric, and allows the device to be turned inside out for cleaning.

Having thus described my invention I desire to secure by Letters Patent and claim:—

1. A fish creel comprising a fabric sack having a reinforced upper edge; longitudinally and laterally disposed leather strips sewed on one face of said fabric having ventilating holes therein and through the fabric to the interior of said sack; a reinforced cover hinged to said sack and having elongated openings therein; a bait pocket within said sack and with its mouth surrounding one of said openings; a hinged cover for each of said openings; and a sanitary lining for said fabric sack and having an open pocket sewed therein.

2. A collapsible fish creel comprising a fabric sack having a reinforced upper edge; leather straps sewed on the outer face of said sack and having ventilating holes therein in alinement with like holes through said fabric; a reinforced cover hinged to the upper edge of said sack and having elongated openings therein; and a sanitary lining sewed to the interior of said sack, with an open pocket sewed on the back of said lining.

In testimony whereof I have affixed my signature.

ANTONE REUBEN LUNDSTEDT.

Certificate of Correction.

It is hereby certified that the name of the assignee in Letters Patent No. 1,543,446, granted June 23, 1925, upon the application of Antone Reuben Lundstedt, of Salt Lake City, Utah, for an improvement in "Collapsible Sanitary Fish Creels," was erroneously written and printed as "Eli J. Marshall," whereas said name should have been written and printed as *Eli J. Marsell,* as shown by the records of assignments in this office; and that the said Letters Patent should be read with this correction therein that the same may conform to the record of the case in the Patent Office.

Signed and sealed this 18th day of August, A. D. 1925.

[SEAL.]
KARL FENNING,
*Acting Commissioner of Patents.*

Certificate of Correction.

It is hereby certified that the name of the assignee in Letters Patent No. 1,543,446, granted June 23, 1925, upon the application of Antone Reuben Lundstedt, of Salt Lake City, Utah, for an improvement in "Collapsible Sanitary Fish Creels," was erroneously written and printed as "Eli J. Marshall," whereas said name should have been written and printed as *Eli J. Marsell*, as shown by the records of assignments in this office; and that the said Letters Patent should be read with this correction therein that the same may conform to the record of the case in the Patent Office.

Signed and sealed this 18th day of August, A. D. 1925.

[SEAL.]
KARL FENNING,
*Acting Commissioner of Patents.*